April 2, 1940.  W. H. HUTCHINS ET AL  2,195,652
CLUTCH FOR RADIO
Filed July 29, 1938
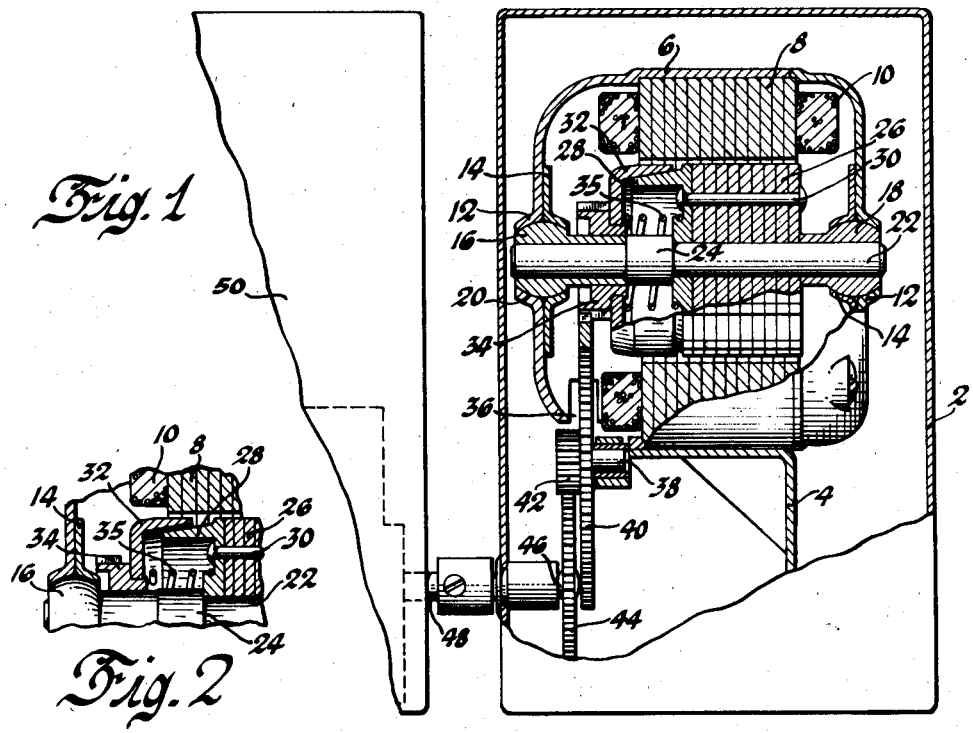
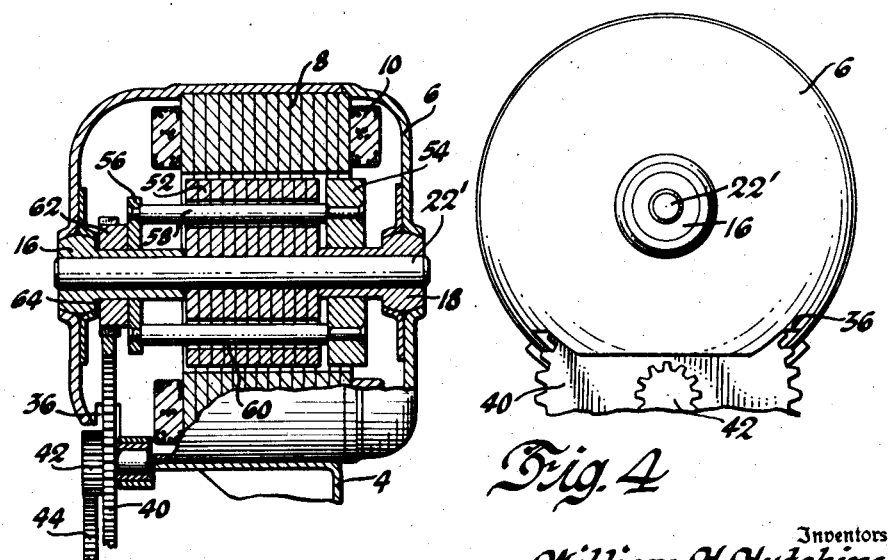
Inventors
William H. Hutchins
& Cyril T. Wallis
By
Blackmore, Lever & Flint
Attorneys Patented Apr. 2, 1940

2,195,652

UNITED STATES PATENT OFFICE 2,195,652

CLUTCH FOR RADIO

William H. Hutchins and Cyril T. Wallis, Rochester, N. Y., assignors to General Motors Corporation, Detroit, Mich., a corporation of Delaware Application July 29, 1938, Serial No. 221,888

4 Claims. (Cl. 172—36)

This invention relates to driving means and more specifically to disconnectable or clutch means between a source of power and the load.

In many instances of drive it is necessary to have the load shaft stop immediately upon the breaking of the motor line current for indexing purposes and not be carried along by the armature whose inertia will cause it to coast to a position further advanced. One instance of this is in tuning mechanism for a radio receiving set where the tuning condensers are turned by a small motor and it is essential to have the condensers index accurately to certain points for the reception of different stations.

It is therefore an object of our invention to provide interconnecting drive means which will enable the load shaft to stop substantially simultaneously with the cessation of drive motor current.

It is a further object of our invention to provide a simple clutch mechanism for the above purpose.

It is a still further object of our invention to provide a clutch which may be mounted directly within the motor housing and therefore will take up no additional space.

With the above and other objects in view which will be apparent as the specification proceeds, the embodiments of our invention will be best understood by reference to the following specification and claims and the illustrations in the accompanying drawings, in which:

Figure 1 is a side elevation of our device, parts being broken away and shown in section.

Figure 2 is a partial sectional view showing the clutch in disengaged position.

Figure 3 is a vertical section through a motor and drive of a modified form of our invention and, Figure 4 is an end view of the device shown in Figure 3.

Referring now specifically to the drawing, 2 indicates a housing for the motor and drive unit. A bracket 4 is provided within the housing upon which is mounted the motor case 6 within which are carried the stator laminae 8 and field windings 10. The end bells of the casing are provided with curved flanged openings 12 and also rigidly secured to the inner surface of the bells adjacent these openings are curved flanged members 14 extending in the opposite direction to the flanges on the bells to cooperate therewith and form a parti-spherical opening within which bearings 16 and 18 are supported. These bearings are formed of tubular sleeves, one end of which has an enlarged outer surface 20 which is parti-spherical to fit within the curved flanges 12 and 14.

A motor shaft 22 is trunnioned within the bearings 16 and 18 and has an enlarged collar portion 24 between the ends for locating purposes. The tubular bearing 16 extends to and abuts one side of the collar 24 to position the shaft and prevent endwise movement in one direction.

Armature laminae 26 are placed on the opposite end of the shaft with a flanged clutch disc 28, said laminae and disc being riveted together by longitudinal rivets 30 and pressed onto the shaft until the assembly meets the collar 24. The tubular portion of the bearing 18 is adapted to extend to and engage the face of the armature to prevent axial movement in the other direction so that the armature is correctly located axially and maintained in that position.

The outer surface of the clutch disc 28 is tapered and adapted to fit within a second flanged clutch plate 32 whose inner surface is tapered to match and form the engaging surface. A spur gear 34 is rotatably and slidably mounted on the extreme surface of the tubular portion of the bearing 18 and has rigidly secured thereto and carries the clutch plate 32. A helical spring 35 concentric with the shaft is located within the hollow formed by the two flanged clutch plates 32 and 28 and tends to force them apart and thereby disengage the clutching surfaces.

It should be noted at this point that the laminae of the armature are not of the same axial length as those of the stator and also that they are not in alignment therewith but rather are eccentric. This provides space for the clutch members to be substantially within one end of the magnetic field of the stator with the movable plate 32 in such a position that the field will exert a force thereon tending to pull it inwardly and cause the clutch faces to engage and driving to take place. As soon as the magnetic field is deenergized the spring 35 will cause the clutch plate 32 to move away and break the driving engagement.

The end bell of the motor case is provided with a slot 36 on the end covering the clutch and adjacent this slot there is supported a stub shaft 38 on the bracket 4. This stub shaft 38 carries two gears 40 and 42 for reducing the speed of rotation, the said gear 40 extending through the slot 36 and meshing with the spur gear and the smaller gear 42 rotating therewith meshing with a gear 44 on a drive shaft 46 which is connected to the shaft to be driven which may be for illustrative purposes a condenser shaft 48 of a receiver 50.

Thus when the motor is energized the movable plate 32 will be drawn into engagement with the rotor disc 26 and the spur gear 34 will drive, but as soon as the current is shut off the spring 36 will immediately cause disengagement and driving will cease but the rotor may coast to a stop thus providing accurate indexing of the driven shaft.

In Figures 3 and 4 is shown a modified form of our invention. In this design the motor casing 6 is the same as in the previous showing as are the stator laminae 8, winding 10 and bearings 16 and 18. The rotor shaft 22' however in this case is of uniform diameter throughout and carries a series of laminae 52 pressed thereon. As before, these laminae are eccentric to the stator laminae. A disc 54 is mounted to rotate on the tubular external surface of the bearing 18 which extends to the rotor laminations. This disc is slightly outside the magnetic field of the stator so that the field will tend to draw it toward the center upon energization.

Mounted on the opposite end on the tubular portion of the bearing 18 for rotation thereon is a second disc 56, said discs 54 and 56 being rigidly connected together by rods 58 which extend through longitudinal openings 60 in the rotor laminations. Also mounted to rotate on the bearing 16 is a spur gear 62 in juxtaposition to the disc 56, a lubricated washer 64 being provided between the spur gear and the case so that the gear may be pressed against the washer by the disc 56 to form a driving contact and a clutch. Gears 40, 42 and 44 are provided as before for transmitting power to the driven shaft.

In this instance, when the motor is energized the disc 54 will be drawn inwardly and transmit this motion to disc 56 which will press against the side of the spur gear 62 and drive the same due to the rotor action on the rods 58. Upon deenergization this force will be removed and the friction between these two surfaces will be insufficient for driving.

It may be advantageous to serrate the engaging faces of the clutch members to provide positive engagement and it is within the scope of our invention to do so. Further, while the invention is illustrated as applied to an alternating current motor, it may be applied equally well to a direct current motor and it is our intention that the invention be not limited to merely the alternating current type as it in no way affects the operation of the device.

We claim:

1. In a device of the class described, a drive shaft, a driven shaft, means interconnecting the two shafts for driving the latter from the former including a clutch, a magnetic field for causing rotation of the first shaft adjacent the clutch means to actuate the same whereby the latter is effected thereby simultaneously with the driving of the first shaft to complete the drive to the second shaft.

2. In a device of the class described, a motor case, a stator therein, a rotor mounted in the case for rotation, driving means rotatably mounted on the rotor shaft and clutch means also mounted on the rotor shaft interconnecting the rotor and driving means, said clutch means being directly magnetically operated by the stator field so that it is in engagement for driving when the stator is energized.

3. In a device of the class described, a shaft adapted to rotate, a rotor mounted on the shaft, a clutch member secured to the shaft, a second clutch member loosely mounted on the shaft and a magnetizable field surrounding the rotating parts and acting directly to cause engagement of the clutch members whereby the rotor will be driven and the clutch parts brought into engagement by the same magnetic field.

4. In a device of the class described, a housing, a stator supported within the housing, a rotor and shaft supported within the stator adapted to be driven by the field thereof, a second shaft carried by the housing in spaced relation to the rotor shaft, driving means loosely mounted on the rotor, engaging means rigidly connected to said second shaft to cooperate with said shaft driving means to transmit power between the two shafts, clutch means rigid with the rotor to cooperate with the loosely mounted means, said loosely mounted means lying directly within the field of the stator and being attracted to engage the clutch on the rotor to cause the first named driving means to rotate with the rotor shaft and drive the second shaft whenever the field is energized.

WILLIAM H. HUTCHINS.
CYRIL T. WALLIS.